April 18, 1961
D. SAINT ET AL
2,979,734
MOTOR DRIVEN CRADLES AND THE LIKE
Filed Oct. 28, 1957
3 Sheets-Sheet 3
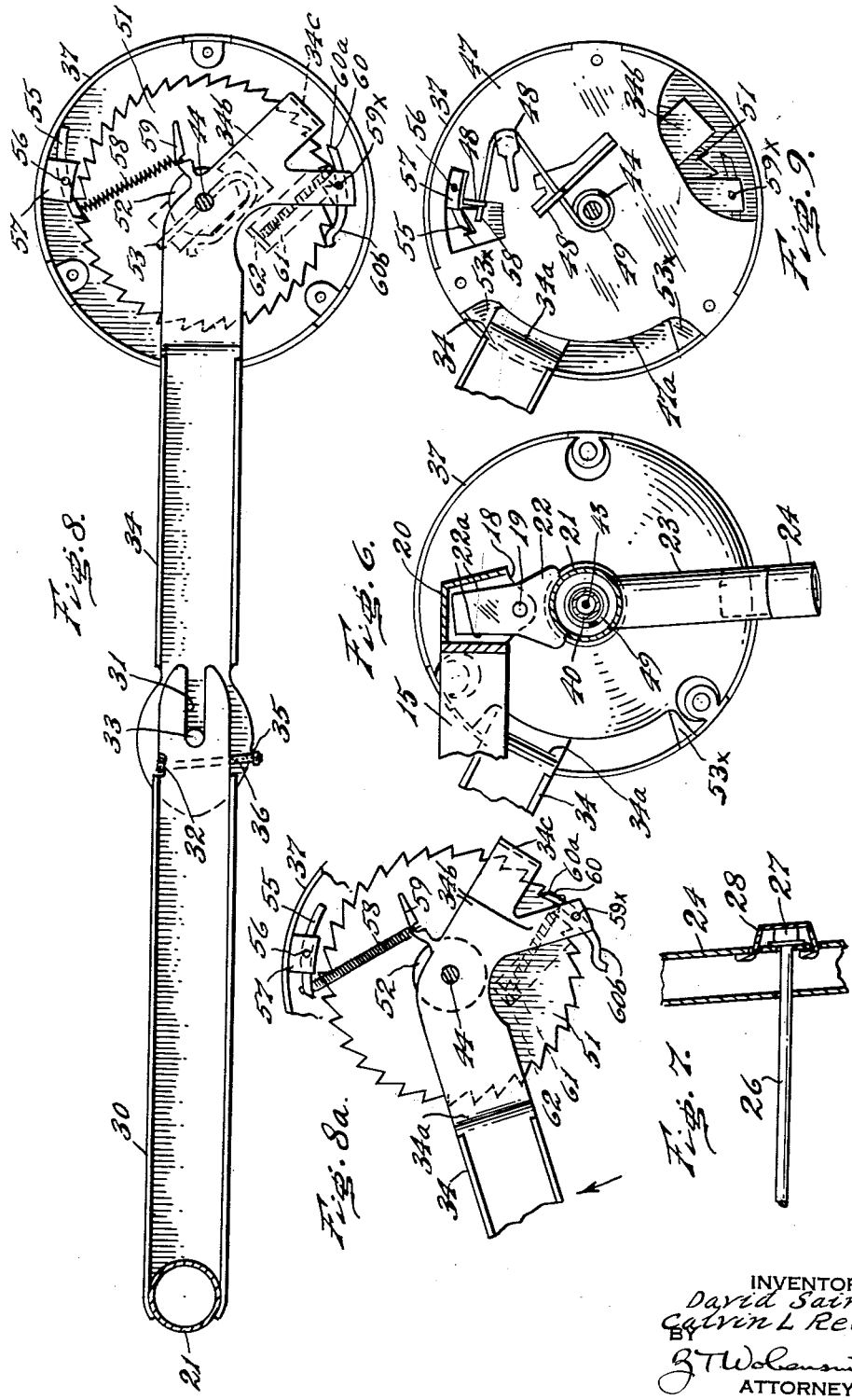
INVENTORS:
David Saint
Calvin L Reed
BY
ATTORNEY

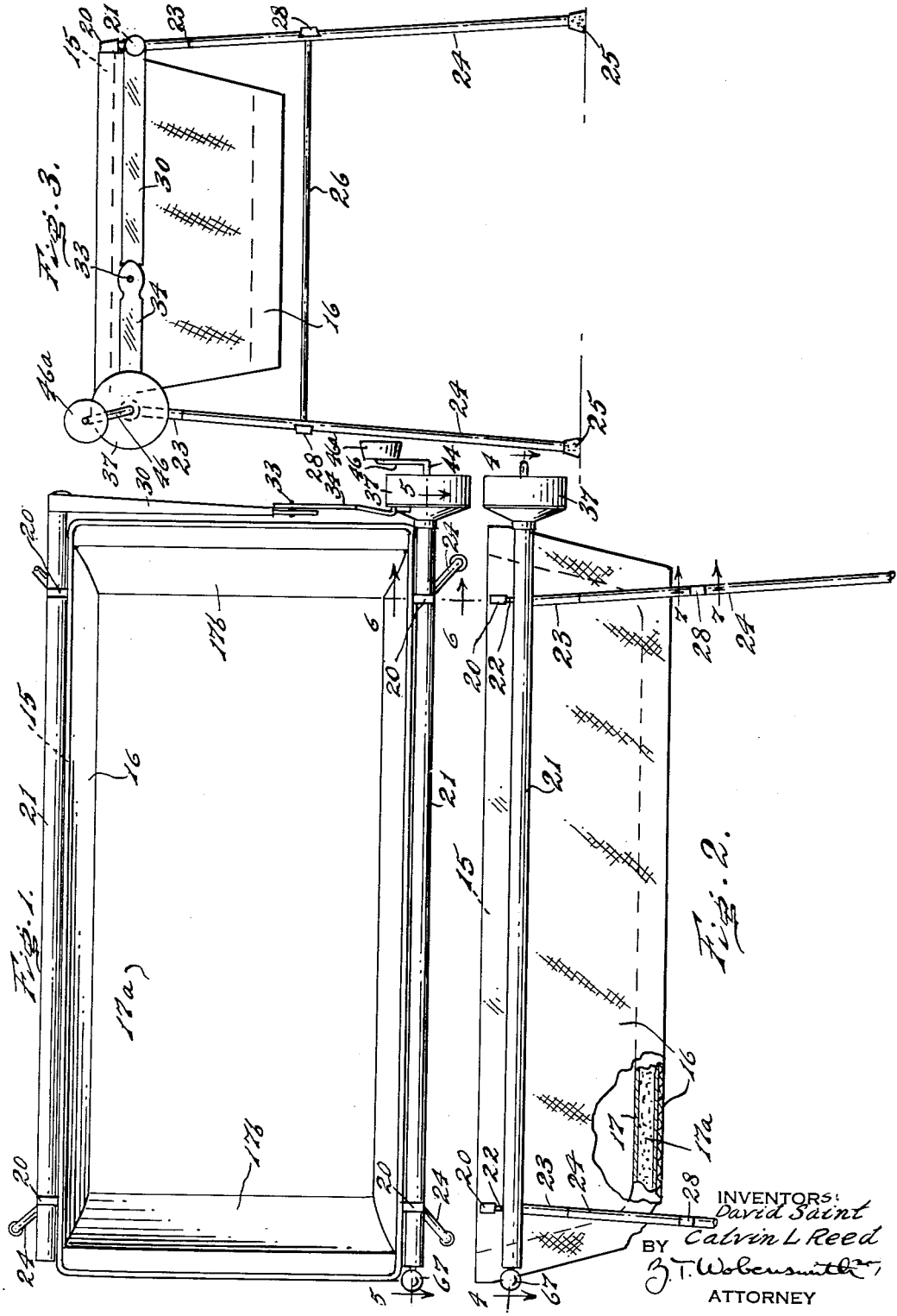

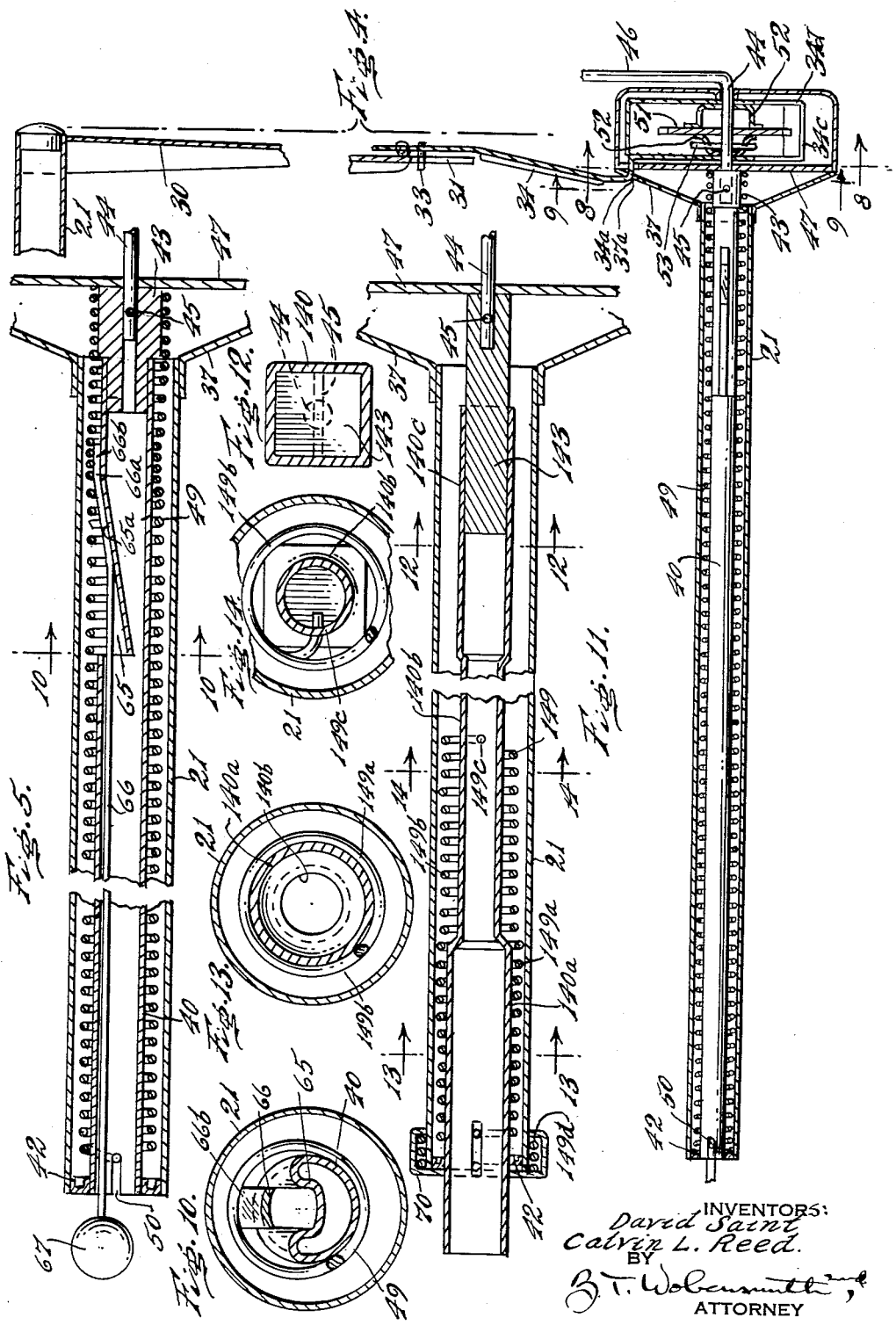

United States Patent Office 2,979,734
Patented Apr. 18, 1961

2,979,734

MOTOR DRIVEN CRADLES AND THE LIKE

David Saint, Rockledge, and Calvin L. Reed, Jenkintown, Pa., assignors to Graco Metal Products, Inc., Huntingdon Valley, Pa., a corporation of Pennsylvania Filed Oct. 28, 1957, Ser. No. 692,871

13 Claims. (Cl. 5—109)

This invention relates to motor driven cradles and the like and particularly to devices of such type having a built in motor for actuating the same.

It is the principal object of the present invention to provide motor operated cradles and the like which are relatively simple in construction so that they can be inexpensively made.

It is a further object of the present invention to provide motor operated cradles and the like which are relatively safe and free from likelihood of injury to the users of the same.

It is a further object of the present invention to provide motor operated cradles and the like in which the time and extent of actuation can be controlled.

It is a further object of the present invention to provide motor operated cradles and the like in which the major components can be made of sheet metal stampings.

It is a further object of the present invention to provide motor operated cradles and the like which can be easily assembled and which will be free from the likelihood of operating difficulties.

It is a further object of the present invention to provide motor operated cradles and the like in which an improved character of spring action is provided.

It is a further object of the present invention to provide motor operated cradles and the like having an improved power actuation with an inverted pendulum support.

It is a further object of the present invention to provide a cradle or the like having an improved support of the inverted pendulum type for oscillation of the cradle or the like in supported relation.

Other objects and advantageous features of the invention will be apparent from the description and claims.

The nature and characteristic features of the invention will be more readily understood from the following description, taken in connection with the accompanying drawings forming part thereof, in which:

Figure 1 is a top plan view of a cradle in accordance with the present invention;

Fig. 2 is a side elevational view of the cradle shown in Fig. 1;

Fig. 3 is an end elevational view of the cradle shown in Figs. 1 and 2;

Fig. 4 is a fragmentary horizontal sectional view, enlarged, taken approximately on the line 4—4 of Fig. 2;

Fig. 5 is a fragmentary vertical sectional view, still further enlarged, taken approximately on the line 5—5 of Fig. 1;

Fig. 6 is a vertical sectional view taken approximately on the line 6—6 of Fig. 1;

Fig. 7 is a vertical sectional view taken approximately on the line 7—7 of Fig. 2;

Fig. 8 is a vertical sectional view, enlarged, taken approximately on the line 8—8 of Fig. 4 and showing one operating position of a portion of the driving mechanism;

Fig. 8A is a view similar to Fig. 8 showing another operating position of the same portion of the driving mechanism;

Fig. 9 is a vertical sectional view, enlarged, taken approximately on the line 9—9 of Fig. 4;

Fig. 10 is a vertical sectional view, enlarged, taken approximately on the line 10—10 of Fig. 5;

Fig. 11 is a view similar to Fig. 5 showing a modified form of power control mechanism;

Fig. 12 is a vertical sectional view, enlarged, taken approximately on the line 12—12 of Fig. 11;

Fig. 13 is a vertical sectional view, enlarged, taken approximately on the line 13—13 of Fig. 11; and Fig. 14 is a vertical sectional view taken approximately on the line 14—14 of Fig. 11.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the invention is illustrated a rectangular frame 15 of metal bars is provided. The frame 15 has secured thereto, and pendant from the space enclosed thereby, a flexible baby carrier or receptacle 16 of fabric, synthetic plastic sheet material or the like. The receptacle 16 is preferably collapsible for shipping purposes and is semi-rigidly held in position for use by a covered liner or insert 17 of corrugated board or the like having a relatively rigid bottom panel 17a and upwardly extending relatively rigid end panels 17b.

At spaced locations on each of the long sides of the frame 15, brackets 18 are secured (see Fig. 6) having pivot pins 19 carried thereby and having generally U-shaped sockets 20 thereabove.

Along each of the long sides of the frame 15, a tubular frame 21 is provided having lugs 22 extending upwardly therefrom through which the pivot pins 19 extend. The upper side portions 22a of the lugs 22 are in spaced relation to, but alternatively abut, the opposite upper interior faces of the sockets 20. This alternate abutting action can be employed to utilize the inherent resilient or spring action of the frame 15 for a limiting and restoring action, as hereinafter explained, and at the same time provides a structure which does not have any tendency to pinch the fingers of the user.

The tubular frames 21 have secured thereto and downwardly extending therefrom tubular sockets 23 for the reception of removable legs 24. The legs 24 are preferably removable to facilitate packaging for shipping or storage.

The legs 24, as will be seen in Figs. 2 and 3, are upwardly and inwardly inclined, the sockets 23 being connected to the frames 21 to provide this inclination.

The lower and supporting ends of the legs 24 are preferably provided with rubber tips 25 to frictionally engage the floor, provide fulcrums and reduce creeping.

The legs 24, by reason of the pivotal mountings provided by the pins 19, permit a sidewise movement of the frame 15, as seen in Fig. 3, with the legs 24 acting as inverted pendulums.

Each opposite pair of legs 24, between the long sides of the frame 15, is connected by a rod 26 which is resilient and bendable between its ends without permanent deformation. The rods 26 extend therethrough and have flattened or distorted heads 27 (see Fig. 7) to prevent their movement inwardly with respect to the legs 24. The heads 27 abut against and are restrained against sidewise removal or outward movement with respect to the legs 24 by caps 28 which are held in clamped engagement on the legs 24. The rods 26, mounted as described, have a restoring spring action, as hereinafter explained.

The cradle is suitable for use as described but is preferably provided with power operating mechanism which will now be described.

One of the tubular frames 21, such as that shown at the right in Fig. 3, has a drive arm 30 rigidly secured at one end thereof. The free end of the arm 30 (see Figs. 4 and 8) is provided with a slot 31 extending inwardly from its end margin and with a hooked tongue 32 spaced inwardly from the end. The slot 31 has a pivot pin 33, such as a headed rivet, extending thereacross, the pin 33 being carried by the outer end of a power arm 34. The power arm 34 is mounted and actuated as hereinafter described with the slot 31 accommodating the movement of the arm 30 and has a hooked tongue 35 opposite the tongue 32 and an endless band 36, of elastic material in tension such as rubber, engaging the tongues 32 and 35 and extending between the contiguous ends of the arms 30 and 34. The band 36 overcomes the force of gravity on the arm 34 causing the pin 33 to always be pushing upwardly in the arm slot 31 of the arm 30. Thus, when the arm 34 receives a powerful impulse the pin 33 does not travel from contact with the lower side of the slot 31 to contact with the upper side of the slot 31, so that a loud click in the operation is thereby avoided.

The other of the tubular frames 21, such as that shown at the left in Fig. 3, has a housing 37 secured thereto, the housing 37 serving to enclose an escapement mechanism and this tubular frame 21 serves for the reception of a source of power, such as a windable spring.

Referring now more particularly to Figs. 5, 8, 8A and 9, the power mechanism is therein more fully illustrated.

A hollow tubular shaft 40 is provided supported at one end by a collar 42 in engagement with the interior of the tubular frame 21 and terminating at the other end at the junction of the frame 21 and the housing 37, and has inserted therein and secured thereto a clutch adapter plug 43 having an outer peripheral face with a diameter greater than that of the outside of the shaft 40. A crank rod 44 is loosely connected to the adapter plug 43 by a pin 45 and extends outwardly beyond the housing 37. The crank rod 44 has an exteriorly accessible crank arm 46 with a handle 46a for manual winding.

Within the interior of the housing 37, a mounting plate 47 is fixedly secured and is provided with a plurality of tongues 48, for retaining engagement with one end of a metallic helical or coil spring 49. The coil spring 49 extends along the shaft 40 and is in engagement at its other end with a slot 50 in the shaft 40. The spring 49 is preferably formed uniformly in the helical portion thereof and serves as a power spring.

A toothed ratchet wheel 51 having spacers 52 secured thereto on opposite sides thereof is connected to the crank rod 44 for rotation therewith by a clip 53 extending through one of the spacers 52 and through the rod 44.

The housing 37 and mounting plate 47 have arcuate openings 37a and 47a therethrough through which an intermediate offset portion 34a of the power arm 34 extends. The power arm 34 has an angularly disposed portion 34b which is freely pivotally mounted on the crank rod 44 and is limited in its movement by bent-out spaced stop tongues 53x on the mounting plate 47 so that it cannot reach the ends of the opening 37a and pinch the fingers of the user upon movement towards either end of its path.

The portion 34b has extending perpendicularly therefrom and spaced outwardly beyond the periphery of the ratchet wheel 51, a connecting plate 34c from which an arm 34d extends parallel to the portion 34b and outside the outer of the spacers 52. The arm 34d is freely pivotally mounted on the crank rod 44.

In order to provide an escapement for the ratchet wheel 51, a pawl 55 is provided pivotally mounted on a pivot pin 56 carried by brackets 57 secured to the interior of the housing 37 and a spring 58 connected to the pawl 55 at one end and to a finger 59 carried by the power arm portion 34b. The spring 58 urges the pawl 55 into engagement with one of the teeth of the ratchet wheel 51 when the arm 34 is in the position shown in Fig. 8, the pawl 55 being released from engagement when the arm 34 is in the position shown in Fig. 8A.

The arm portion 34b and the arm 34d carry a pawl pivot 59x for the pivotal mounting of a pawl 60. The pawl 60 has an end portion 60a for engagement with one of the teeth of the ratchet wheel 51 and a control portion 60b of curved shape which when engaged by one of the ratchet teeth tends to urge the pawl 60 into ratchet engagement. A spring 61 is provided connected at one end to the pawl 60 and at the other end to an abutment 62 carried by the outer end wall of the housing 37.

The spring 61 urges the pawl 60 into engagement with one of the teeth of the ratchet wheel 51 when the arm 34 is in the position shown in Fig. 8A, the pawl 60 being released from engagement when the arm 34 is in the position shown in Fig. 8.

The bent or curved portion 60b of the pawl 60 enhances the safety of the structure, and prevents undesirable slipping as well as undesired unwinding of the spring 49.

The action of the pawl 60 is illustrated in some detail in Figs. 8 and 8A from which it will be seen that upon excessively rapid movement clockwise of the ratchet wheel 51, the teeth thereof upon contact with the curved portion 60b and by their impact thereagainst tend to swing the ratchet pawl 60 into locked or ratchet engaging position with the teeth in a manner which would not occur in normal slow movement of the ratchet plate 51 which occurs as the arm 34 swings, and in cooperation with the pawl 55.

It has been found desirable for some applications to provide for varying the extent of the oscillation of the cradle by limiting the winding of the power spring 49.

One suitable arrangement for this purpose is shown in Figs. 5 and 10. The shaft 40 is provided with a struck in portion 65 having an inclined wall 65a for guiding a control rod 66. The control rod 66 is provided with a knob 67 for longitudinal positioning of the same along the shaft 40. The control rod 66, at its inner end, has a guide portion 66a and a flat end portion 66b. The positioning of part or all of the end portion 66b so that it is disposed outwardly of the periphery of the shaft 40, presents a larger diameter clutch area than that provided on the periphery of the plug 43 so that when the spring 49 is half wound it engages the flat portion 66b and the shaft 40 and prevents any further winding of the left hand portion of the spring 49. Thus the power and the time of running are limited.

Another suitable arrangement for controlling the extent of winding of the power spring is illustrated in Figs. 11 to 14, inclusive.

In this form of the invention, a spring 149 is provided having a portion 149a of one diameter, the remainder of the spring 149 being of the same or smaller diameter, as at 149b.

The shaft 140 is itself slidably mounted, has a portion 140a of larger diameter, movable for varying the extent of spring engagement therewith upon winding, and a portion 140b of smaller diameter. The shaft 140, at the crank end, has an end portion 140c of square cross-section slidable on an adapter 143 of square cross section to which the crank rod 44 is secured as before. One end portion 149c of the spring 149 extends through the shaft 140 for movement therewith and the other end portion 149d of the spring 149 extends outwardly and for several turns around a portion of larger diameter which can be disposed inside the tubular frame 21 or outside and covered by an end sleeve 70.

The mode of operation will now be pointed out, reference being had first to Figs. 1 to 10, inclusive.

The crank arm 46 is turned in a clockwise direction, as seen in Fig. 3, to wind the spring 49. The pawl 55 normally tends to prevent undesired unwinding of the spring 49. The spring force of the spring 49 acting on the shaft 40 starts the unwinding movement of the shaft 40. The ratchet pawls 55 and 60 successively engage and disengage the teeth of the ratchet wheel 51, the springs 58 and 61 tending alternately to pull the pawls 55 and 60 into positions of engagement and disengagement as illustrated in Figs. 8 and 8A.

It will be noted that the movement of the finger 59, with movement of the arm 34 relative to the bracket 57 controls the resilient actuation of the pawl 55, while the movement of the arm 34 with respect to the bracket 62 controls the resilient actuation of the pawl 60. In this manner, and with the pawls 55 and 60 providing an escapement, the power arm 34 is effective for actuating the drive arm 30, impelled by the spring 49.

The oscillatory motion thus imparted to the tubular frame 21 is effective for imparting an oscillatory movement to the legs 24 in a sidewise direction, the lower ends of the legs 24 serving as fulcrums for this movement.

As the pairs of legs 24 are moved from a central or neutral position in either sidewise direction, the rods 26 are stressed out of their straight positions, the stressing tending to apply therein an S-bend between their ends by reason of the rigid engagement of their heads 27 with the legs 24 and with the caps 28. A resilient or spring action is thus provided tending to urge the legs 24 towards their neutral positions upon movement past the neutral position on either side but over-running the neutral position first on one side and then on the other. The frame 15 acts essentially as a spacer, the force application providing the oscillatory movement of the legs 24, and normally no torque is applied onto the frame 15. The upper ends of the legs 24 carry the frame 15 with them in their sidewise travel. The only action between the frame 15 and the upper side portions 22a of the lugs 22 is to provide an additional spring action by a slight turning of both side rails of the frame 15 in the same directions.

It will be noted also that as the upper side portions 22a of the lugs 22 alternately engage the opposite inner faces of the sockets 20, a further opposing spring action is made available by the opposing resilience of the side rails of the frame 15 with their resistance to distortion.

It will further be noted that upon the winding of the spring 49, so that the same is radially contracted, a limited number of turns of the spring 49 first come into contact with the exterior surface of the plug 43, and the engagement of these turns prevents excessive winding of the spring 49.

When the spring 49 is wound to a tight condition and to what is apparently the utmost extent, by turning of the crank arm 46, upon movement of the arm 34 and the arm portion 34b in a direction further tending to wind the spring 49, these turns in engagement with the adapter plug 43 function as a clutch overtravel device permitting some further winding, thus protecting the spring mounting from over stress.

The extent of winding of the spring 49 is varied by adjustment of the position of the control rod 66 and the portion 66b. With the portion 66b in its slow position the spring 49 first tightens on the portion 66b and the opposite side of the shaft 40 when the spring 49 is about one half wound. Further winding of the spring 49 immediately causes it to tighten on the plug 43 as pointed out above. Upon attempting to wind the spring 49, an apparently fully wound condition of the spring 49 is encountered, with what is actually less than the total winding available. Accordingly, by regulating the engagement of the spring 49 the length of time the cradle will operate can be readily determined and selected. The maximum time period will of course be available with the control rod 66 retracted.

In the form of power control illustrated in Figs. 11 to 14, inclusive, the determination of the number of turns engaging the enlarged portion 140a of the shaft 140 is dependent upon the positioning of the enlarged portion 140a. This is illustrated in Fig. 11 at its inner position for a minimum time period of operation but is movable to the left to increase the available time period of operation. The same effect can be obtained as with the control rod 66.

We claim:

1. A cradle or the like for infants comprising a frame, a receptacle for an infant pendantly supported by said frame, side frame members extending along opposite sides of said frame, hinge connections between said side frame members and said frame, spaced pairs of supporting legs secured to said side frame members and extending downwardly therefrom, the legs of each pair being in non-parallel relation and having lower free supporting ends providing fulcrums, the legs of each pair having a resilient connector therebetween providing a restoring force and urging said legs to an intermediate position, one of said side frame members having a drive arm connected thereto, the other of said side frame members having a manually windable power source therein, a power arm pivotally connected to said drive arm in driving relation thereto, and an escapement mechanism interposed between said power source and said power arm.

2. A cradle or the like as defined in claim 1 in which said pivotal connections have stop portions for limiting the extent of movement thereof in opposite directions.

3. A cradle or the like as defined in claim 1 in which said pivotal connections have stop portions for limiting the extent of movement thereof in opposite directions and said stop portions are interiorly enclosed.

4. A cradle or the like as defined in claim 1 in which said pivotal connections have stop portions for limiting the extent of movement thereof in opposite directions and said frame is resilient and resistant to distortion upon engagement of said stop members for applying a restoring force through said connections and said frame members to said legs.

5. A cradle or the like as defined in claim 1 in which said resilient connector is a rod locked at each end to one of said legs and bendable between its ends.

6. A cradle or the like as defined in claim 1 in which a resilient member is interposed in tension between said arms contiguous to said pivotal connections and has portions respectively in engagement with opposed portions of said arms.

7. A cradle or the like as defined in claim 1 in which control members are provided for engagement with said power source for limiting the extent of winding thereof and thereby determining the extent of movement of said receptacle.

8. A cradle or the like as defined in claim 1 in which said other side frame member has a housing at one end thereof within which said escapement is enclosed and from which said power arm extends.

9. A cradle or the like as defined in claim 1 in which said other side frame member has a housing at one end thereof within which said escapement is enclosed and from which said power arm extends, and said housing has internally disposed stops therein for limiting the movement of said power arm.

10. A cradle or the like as defined in claim 1 in which said other side frame member has a housing at one end thereof, a shaft is provided interiorly of said other side frame member, said power source is a coil spring secured at one end to said shaft and extends therealong and is secured at the other end in fixed relation to said other side frame member, a winding crank arm extends outwardly of said housing, a ratchet wheel is secured to said shaft rotation therewith, and a pair of ratchet members are provided in said housing for alternate engagement with said ratchet wheel, one of said ratchet members being carried by said housing and the other of said ratchet members being carried by said power arm.

11. A cradle or the like as defined in claim 1 in which said receptacle has a stiffener extending along the bottom and upwardly at the ends thereof for reducing the sidewise sway of said receptacle with respect to said frame.

12. A movable support for a human body comprising a frame, a body supporting portion supported by said frame, side frame members extending along opposite sides of said frame, pivotal connections between said side frame members and said frame, spaced pairs of supporting legs secured to said side frame members and extending downwardly therefrom, the legs of each pair being in non-parallel relation and having lower free supporting ends providing fulcrums, the legs of each pair having a resilient connector therebetween providing a restoring force and uring said legs to an intermediate position, one of said side frame members having a drive arm connected thereto and the other of said side frame members having a power source therein, a power arm pivotally connected to said drive arm in driving relation thereto, and an escapement mechanism interposed between said power source and said power arm.

13. A movable support for a human body comprising a frame, a body supporting portion supported by said frame, side frame members extending along opposite sides of said frame, pivotal connections between said side frame members and said frame, spaced pairs of supporting legs secured to said side frame members and extending downwardly therefrom, the legs of each pair being in non-parallel relation and having lower free supporting ends providing fulcrums, the legs of each pair having a resilient connector therebetween providing a restoring force and urging said legs to an intermediate position, and a resilient member interposed in tension between said arms contiguous to said pivotal connections, said resilient member having portions respectively in engagement with opposed portions of said arms.

References Cited in the file of this patent

UNITED STATES PATENTS

| | | |
|---|---|---|
| 22,056 | Ball | Nov. 16, 1858 |
| 46,529 | Metzler | Feb. 21, 1865 |
| 198,784 | Adams | Jan. 1, 1878 |
| 417,812 | Cobleigh | Dec. 24, 1889 |
| 528,026 | Phillips | Oct. 23, 1894 |
| 1,514,472 | Spady | Nov. 4, 1924 |
| 2,302,239 | McKinney | Nov. 17, 1942 |
| 2,559,939 | Carlson | July 10, 1951 |
| 2,807,309 | De Saint et al. | Sept. 24, 1957 |

UNITED STATES PATENT OFFICE
CERTIFICATION OF CORRECTION

Patent No. 2,979,734　　　　　　　　　　　　　April 18, 1961

David Saint et al.

It is hereby certified that error appears in the above numbered patent requiring correction and that the said Letters Patent should read as corrected below.

Column 7, line 18, for "uring" read -- urging --.

Signed and sealed this 22nd day of August 1961.

(SEAL)
Attest:

ERNEST W. SWIDER
Attesting Officer

DAVID L. LADD
Commissioner of Patents